United States Patent
Agro (10) Patent No.: US 10,225,303 B2
(45) Date of Patent: Mar. 5, 2019

(54) METHOD FOR RENDERING A SHARED CONTENT, CORRESPONDING METHOD FOR SHARING, COMPUTER PROGRAM PRODUCTS AND DEVICES

(71) Applicant: Orange, Paris (FR)

(72) Inventor: Roberto Agro, Bourg la Reine (FR)

(73) Assignee: ORANGE, Paris (FR)

( * ) Notice: Subject to any disclaimer, the term of this patent is extended or adjusted under 35 U.S.C. 154(b) by 52 days.

(21) Appl. No.: 15/085,518

(22) Filed: Mar. 30, 2016

(65) Prior Publication Data

US 2016/0294905 A1 Oct. 6, 2016

(30) Foreign Application Priority Data

Mar. 30, 2015 (FR) ..................... 15 52652

(51) Int. Cl.
*H04L 29/06* (2006.01)
*G06F 21/10* (2013.01)
(Continued)

(52) U.S. Cl.
CPC ............ *H04L 65/601* (2013.01); *G06F 21/10* (2013.01); *H04N 21/4122* (2013.01); *H04N 21/4126* (2013.01); *H04N 21/4227* (2013.01); *H04N 21/4307* (2013.01); *H04N 21/6547* (2013.01); *H04N 21/6587* (2013.01); *H04W 4/21* (2018.02); *G06F 2221/0793* (2013.01)

(58) Field of Classification Search
CPC ................................................... H04L 65/601
See application file for complete search history.

(56) References Cited

U.S. PATENT DOCUMENTS

2012/0082424 A1* 4/2012 Hubner ............... H04N 21/242
386/219
2013/0031162 A1* 1/2013 Willis ................. H04L 65/1069
709/203
(Continued)

FOREIGN PATENT DOCUMENTS

FR 2992511 A1 12/2013

OTHER PUBLICATIONS

English translation of the Written Opinion dated Feb. 11, 2016 for corresponding French Application No. 1552652, filed Mar. 30, 2015.
(Continued)

*Primary Examiner* — Suraj M Joshi
(74) *Attorney, Agent, or Firm* — David D. Brush; Westman, Champlin & Koehler, P.A.

(57) ABSTRACT

A method is disclosed for the rendering, by a second terminal, of a content shared by a first terminal with the second terminal, the first terminal being engaged in playing back the content. The method includes a playback, by the second terminal, of the content from an effective temporal position within the content. The effective temporal position is determined as the temporal position of the content played back by the first terminal at the instant when a server receives a first request, the second terminal having transmitted the first request to the server following reception of an invitation by the first terminal to share in the playback of the content. The first request is a request for obtaining a content playback starting temporal position.

8 Claims, 3 Drawing Sheets

(51) Int. Cl.
    *H04N 21/41*     (2011.01)
    *H04N 21/4227*     (2011.01)
    *H04N 21/43*     (2011.01)
    *H04N 21/6547*     (2011.01)
    *H04N 21/6587*     (2011.01)
    *H04W 4/21*     (2018.01)

(56) References Cited

U.S. PATENT DOCUMENTS

2013/0251329 A1*   9/2013   McCoy ................ H04N 21/654
                                                          386/201
2014/0325541 A1   10/2014   Hannes et al.

OTHER PUBLICATIONS

French Search Report and Written Opinion dated Feb. 11, 2016 for corresponding French Application No. 552652, filed Mar. 30, 2015.

\* cited by examiner

METHOD FOR RENDERING A SHARED CONTENT, CORRESPONDING METHOD FOR SHARING, COMPUTER PROGRAM PRODUCTS AND DEVICES

1. CROSS-REFERENCE TO RELATED APPLICATIONS

This Application claims priority to and the benefit of French Patent Application No. FR1552652, filed Mar. 30, 2015, the content of which is incorporated herein by reference in its entirety.

2. FIELD OF THE DISCLOSURE

The field of the disclosure is that of the consumption of audio and/or video contents in terminals (smartphones, tablets, computers, etc.).

More specifically, the disclosure pertains to a technique for rendering a shared content between a first terminal and a second terminal, the first terminal being engaged in playing back the content.

This technique can be applied especially but not exclusively to the sharing of videos on the Internet.

3. TECHNOLOGICAL BACKGROUND

The consumption of online videos on websites offering an online video hosting, sharing and viewing service (for example "YouTube" (Registered Mark) or "Dailymotion" (Registered Mark) sites) is growing and is accompanied by a desire to share and exchange these videos between users. In addition, "second screen" type mobile applications, synchronized with video, are intensifying the experience through additional contents such as quizzes and polls. One case of use consists of an "extended virtual couch" which means that a user can invite others to get synchronized with the video and carry out exchanges via a chat or a "second screen" application (quizzes, competitions, games, etc.).

There is a known way of defining a shared space in which a content (for example a video), is played back, each participant linking up to this space to see the video. As a result, unless the transmission times are different, each participant sees the same instant of the video at the same point in time.

The drawback of this known approach that if one of the participants wishes to carry out an action on the content (such as seeing a passage again), then all the participants experience the effects of this action, and this is not always desirable.

Another drawback of this known approach of synchronized viewing of a content is that it necessitates the management of a shared space with a special protocol and a shared network, incompatible with the contents available on the Internet (for example "YouTube" (Registered Mark) or "Dailymotion" (Registered Mark), and a non-guaranteed transmission time.

4. SUMMARY

One particular embodiment of the present disclosure proposes a method for the rendering, by a second terminal, of a content shared by a first terminal with the second terminal, the first terminal being engaged in playing back the content. The method of rendering includes the playback, by the second terminal, of the content from an effective temporal position (ETP) within the content, the effective temporal position being determined as the temporal position of the content played back by the first terminal at the instant T1 when a server receives a first request, the second terminal having transmitted the first request to the server following reception of an invitation by the first terminal to share in the playback of the content, the first request being a request for obtaining a content playback starting temporal position.

An exemplary general principle of the proposed solution therefore relates to activating the playback of the content on the second terminal (guest terminal) from a particular temporal position within the content, called an effective temporal position. This effective temporal position is defined as the temporal position (i.e. the instant) of the content played back by the first terminal at the point in time where the server has received the first request (i.e. the request through which the second terminal asks the server to give it the content playback starting temporal position).

Thus, the proposed solution relies on a wholly novel and inventive approach enabling a sharing of a playback of a content at a given temporal position (i.e. instant) of the content without requiring the management of a shared space and therefore without any network constraints. The proposed solution therefore works with classic online contents such as those available on "YouTube" (Registered Mark) or "Dailymotion" (Registered Mark) type websites.

In addition, once the effective temporal position has been retrieved by the second terminal (or more generally by any guest terminal whatsoever), the proposed solution enables the user or users of each of the terminals (the inviting individual as well as the invitees) to move in the content (forward/rewind) as he wishes without any impact on the other terminals.

The proposed solution enables sharing between two terminals belonging to a same user or to distinct users: hence it enables not only the sharing of content by a user with another user but also the sharing of one terminal of a user with another terminal of the same user (who can thus change screens).

According to one particular characteristic, the method for rendering comprises, prior to the playback, a comparison by the second terminal of the effective temporal position ETP with the duration D of the content and the playback is done by the second terminal only if ETP<D.

Thus, the second terminal easily ascertains that the second terminal has not delayed too much before accepting the invitation from the first terminal, especially that the user of the second terminal has not waited too long before accepting the invitation from the user of the first terminal (and has therefore waited too long before trying to access the content).

According to one particular characteristic, if ETP≥D, the comparison is followed by the furnishing by the second terminal, via a man-machine interface, of a message indicating that the first terminal has stopped playing back the content and/or that a shared playback is impossible.

Another embodiment proposes a method for the determining, by a server, of an effective temporal position within a shared content shared by a first terminal with a second terminal, the first terminal being engaged in playing back the content. The method for determining comprises a transmission by the server to the second terminal of a response to a first request from the second terminal, the response containing, as a content playback starting temporal position, an effective temporal position ETP within the content, the effective temporal position being determined as the temporal position of the content played back by the first terminal at the instant T1 when the server receives the first request from the second terminal, the second terminal having transmitted the first request to the server following reception of an invitation from the first terminal to share in the playback of the content, the first request being a request for obtaining a content playback starting temporal position.

According to one particular characteristic, the method for determining comprises a determining by the server of said effective temporal position ETP.

According to one particular characteristic, the method for determining comprises:
 a reception by the server of a second request transmitted by the first terminal in order to indicate a wish to share the content, the second request having, as parameters, an address of the content, a duration D of the content and a current temporal position CTP of playback of the content by the first terminal,
 a storing by the server, in association with an identifier, of the parameters of the second request and a piece of time-stamp information indicating the instant T2 of reception of the second request by the server;
and the server determines said effective temporal position according to the following formula: ETP=(T1−T2)+CTP.

In this way, the server can easily calculate the effective temporal position.

According to one particular characteristic, the storage is followed by a transmission from the server to the first terminal of a response to said second request containing said identifier, said invitation and said first request having said identifier as a parameter.

Thus, the identifier enables a link to be set up between the server, the first terminal and the second terminal in their exchanges pertaining to the sharing of the content.

According to one particular characteristic, the response to the first request also contains the address of the content and the duration of the content.

According to one particular characteristic, the determining of the effective temporal position ETP is followed by a comparison, by the server, of the effective temporal position ETP with the duration D of the content and the transmission of the response to the first request is executed only if ETP<D.

Thus, the server easily ascertains that the second terminal has not delayed too long in accepting the invitation from the first terminal (and has therefore waited too long before trying to access the content). In addition, the playback by the second terminal is executed only if ETP<D (i.e. only if the second terminal receives the response to the first request).

According to one particular characteristic, if ETP≥D, the method for determining comprises a transmission by the server to the second terminal of a message indicating that the first terminal has stopped playing back the content and/or that a shared playback is impossible.

Another embodiment proposes a method for sharing a content between a first terminal and a second terminal, the first terminal being engaged in playing back the content. The method of the invention comprises a transmission, by the first terminal to the second terminal, of an invitation to share in the playback of the content, the invitation enabling the second terminal to play back the content from an effective temporal position ETP within the content that is determined, upon a first request from the second terminal, as the temporal position of the content played back by the first terminal at the instant T1 when a server has received said first request.

Another embodiment proposes a computer program product comprising program code instructions for implementing the method of rendering by the second terminal when said program is executed on a computer.

Another embodiment proposes a computer program product comprising program code instructions for implementing the method of determining, by the server, when said program is executed on a computer.

Another embodiment proposes a computer program product comprising program code instructions for implementing the method of sharing, by the first terminal when said program is executed on a computer Another embodiment proposes one or more computer-readable and non-transient storage media storing at least one of the above-mentioned computer program products.

Another embodiment proposes a second terminal, configured to render a content shared by a first terminal with the second terminal, the first terminal being engaged in playing back the content. The second terminal comprises means for playing back the content from an effective temporal position ETP within the content, the effective temporal position being determined as the temporal position of the content played back by the first terminal at the instant T1 when a server receives a first request, the second terminal having transmitted the first request to the server following a reception of an invitation from the first terminal to share in the playback of the content, the first request being a request for obtaining a content playback starting temporal position.

Another embodiment proposes a server, configured to determine an effective temporal position within a shared content shared by a first terminal with a second terminal, the first terminal being engaged in playing back the content. The server comprises means of transmission to the second terminal of a response to a first request from the second terminal, the response containing, as the content playback starting temporal position, an effective temporal position ETP within the content, the effective temporal position being determined as the temporal position of the content played back by the first terminal at the instant T1 when the server receives the first request from the second terminal, the second terminal having transmitted the first request to the server following reception of an invitation from the first terminal to share in the playback of the content, the first request being a content playback starting temporal position.

Another embodiment proposes a first terminal configured for the sharing of a content with a second terminal, the first terminal being engaged in playing back the content. The first terminal comprises means of transmission to the second terminal of an invitation to share in the playback of the content, the invitation enabling the second terminal to play back the content from an effective temporal position ETP within the content determined, upon a first request from the second terminal, as the temporal position of the content played back by the first terminal at the instant T1 at which a server has received said first request.

5. LIST OF FIGURES

Other features and advantages shall appear from the following description given by way of an indicative and non-exhaustive example, and from the appended drawings, of which.

6. DETAILED DESCRIPTION

In all the figures in the present document, the identical steps are designated by a same numerical reference.

Figure 1:
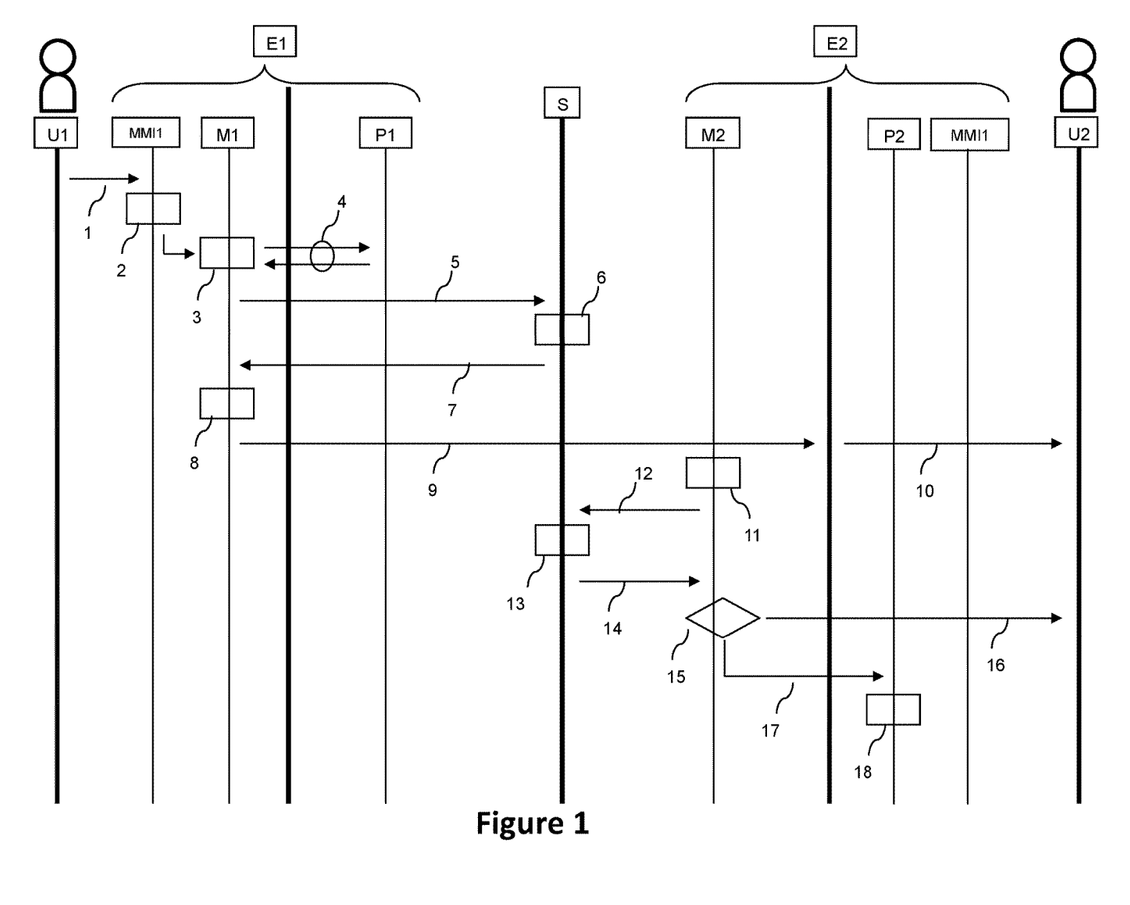
FIG. 1 presents a sequence diagram illustrating a method for rendering a shared content according to a first particular embodiment of the disclosure.

Referring now to FIG. 1, we present a method for rendering a shared content according to a first particular embodiment of the disclosure.

This method is implemented in a system comprising especially a first terminal E1, a second terminal E2 and a server S for managing temporal playback positions also called a "playback position server". For example, the first terminal E1 is a terminal of a first user U1 and the second terminal E2 is a terminal of a second user U2.

In a first implementation, the first user and a second user are two distinct persons.

In a second particular implementation, the first user and the second user are one and the same person. In other words, the first terminal and second terminal are used by one and the same user. This enables this user to start playing back a content on his first terminal and then ask his second terminal (and/or the terminal of another user) to link up to this playback of the content.

Thus, the proposed solution enables sharing between two terminals of a same user or between two terminals of distinct users: hence it enables not only the sharing of a content by one user with another user but also the sharing of a terminal with another terminal of one and the same user (who can thus change screens).

The content is for example an audio content and/or video content (a film, a slide-show) which can be consumed via a protocol (for example the "HTTP" protocol or the "adaptive streaming" protocol) that makes it possible to search or seek within the content, i.e. giving the capacity to take position at a given precise point in time (i.e. a precise temporal position) of the content.

The terminals E1, E2 are for example smartphones, tablets or computers.

In the example presented here below, each terminal E1, E2 comprises especially:
- a man-machine interface MMI1, MMI2;
- a content player P1, P2, which typically is an application that gets executed on the operating system of the terminal; and
- a module M1, M2 comprising at least one software component and/or hardware component.

The term "module" can correspond in the present description equally well to a software component and to a hardware component or to a set of hardware and software components.

A software component corresponds to one or more computer programs, one or more sub-programs of a program or more generally to any element of a program or a piece of software capable of implementing a function or a set of functions as described here below for the module concerned. Such a software component is executed by a data processor of the terminal (a physical entity) and is capable of accessing hardware resources of the terminal (memories, recording media, communications buses, input/output electronic boards, user interfaces, etc).

The hardware component corresponds to any element of a hardware unit capable of implementing a function or a set of functions as described here below for the module concerned. It can be a programmable hardware component or a component with an integrated processor for the execution of software, for example an integrated circuit, a smartcard, a memory card, an electronic board for the execution of firmware, etc.

Here below in the description, it is assumed by way of an example that the first terminal E1 shares a content C with a second terminal E2, especially when a user U1 wishes to share the content C with the second user U2. It also assumed that the first terminal E1 (and more specifically the player P1 of this terminal) is engaged in playing back the content C, making it possible especially for the first user U1 to be engaged in consuming the content C. Finally, it is assumed that the content C is defined by its duration "C_duration" and its address "C_URL".

The first user U1 (in a step referenced 1) triggers an invitation function, on the man-machine interface MMI1 of the first terminal E1, for making invitations to the viewing of content and of choosing (step referenced 2) one or more terminals, especially choosing one or more users (including the second user U2) whom this user wishes to invite to view the content C (at the same temporal position, i.e. at the very instant in which he is situated himself in this content C).

The module M1 of the first terminal E1 (in a step referenced 3) retrieves the current temporal position in the viewing of the content C from the player P1 of the first terminal E1 (through an exchange of messages symbolized by the pair of arrows referenced 4). The current temporal position is designated by "Initial_Playback_Position U1".

In order to indicate the wish to share the content C, the module M1 (in the step referenced 5) sends a "Set_Playback_Position" request to the server S with the following parameters: the current temporal position "Initial_Playback_Position U1" as well as the address "C_URL" and the duration "C_Duration" of the content C.

The server S (in the step referenced 6) in association with a unique identifier ("Playback_Position_U1_ID"), stores these three parameters as well as a piece of time-stamping information ("Initial_Request_Time-stamp") indicating the instant of reception of the "Set_Playback_Position" request by the server. In other words, the server creates an input in a database storing the three parameters and the time-stamp information.

The server (in a step referenced 7) sends back a response to this request, containing the identifier "Playback_Position_U1_ID". In one variant, the response is a URL address ("Playback_Position_U1_URL") including the identifier "Playback_Position_U1_ID".

The module M1 receives this response and retrieves the address "Playback_Position_U1_URL" or builds it from the identifier"Playback_Position_U1_ID" (step referenced 8).

The module M1 (in a step referenced 9) transmits this address URL (as a parameter of a content-sharing invitation) to the terminals of the users selected by the first terminal E1, especially by the user U1 on the man-machine interface MMI1 of the first terminal E1, these selected terminals including the second terminal E2. The transmission can be done in different ways (by SMS, social networks, push-type notification, particular protocol, etc.).

The second terminal E2 (in a step referenced 10) informs a second user U2 of the invitation from the first user U1, according to the sharing choice (publishing on social networks, reception of SMS or email, etc.).

If the second user accepts the invitation (via the man-machine interface MMI2), the module M2 of the second terminal E2 retrieves (step referenced 11) the address "Playback_Position_U1_URL" of the identifier "Playback_Position_U1_ID", with this identifier as a parameter in order to obtain the playback starting temporal position for the content C.

The server receives the "Get Playback Position" request and (in the step referenced 13) computes an effective temporal position ("Current_Playback_Position_U1") which it forwards (in a step referenced 14) in its response. The response also contains the address "C_URL" and the duration "C_Duration" of the content C.

The effective temporal position ("Current_Playback_Position_U1") is defined as the temporal position of the content C played back by the first terminal E1 at the instant when the server has received the "Get_Playback_Position" request. The server determines the effective temporal position according to the following formula:

$$\text{Current\_Playback\_Position\_U1} = (T1-T2) + \text{Initial\_Playback\_Position\_U1},$$ with:

T1 instant of reception of the "Get_Playback_Position" request by the server,

T2 instant of reception of the "Set_Playback_Position" request by the server (T2 is given by the time-stamp information "Initial_Request_Time-stamp").

Like the current temporal position or "Initial_Playback_Position_U1", the effective temporal position ("Current_Playback_Position_U1") is a piece of relative temporal information (relative to the start of the content) and not a piece of absolute time-stamp information.

After having received the response (and therefore retrieved the effective temporal position "Current_Playback_Position_U1", as well as the address "C_URL" and the duration "C_Duration" of the content C), the module E2 (in a step referenced 15) compares the effective temporal position ("Current_Playback_Position_U1") with C_Duration.

If Current_Playback_Position_U1 is greater than or equal to C_Duration, the module M2 of the second terminal E2 (in a step referenced 16) the second user U2, via the man-machine interface MMI2, a message stating that the first terminal has stopped playing back the content and/or that shared playback is impossible. This corresponds to the case where the second terminal has delayed far too much before accepting the invitation from the first terminal, and especially that the second user U2 has waited far too long before accepting the invitation from the first user (and has therefore tried to access the content C).

If Current_Playback_Position_U1 is smaller than C_Duration, the module M2 of the second terminal E2 (in a step referenced 17), activates the player P2 of the second terminal E2 by giving it the address "C_URL" of the content and the starting playback position "Current_Playback_Position_U1". The player P2 of the second terminal E2 can then (in a step referenced 18) play the content C at the position where the player P1 of the first terminal E1 is supposed to be at this time (with a slight lag related to the time taken for the exchanges on the network connecting the two terminals E1, E2).

Figure 2:
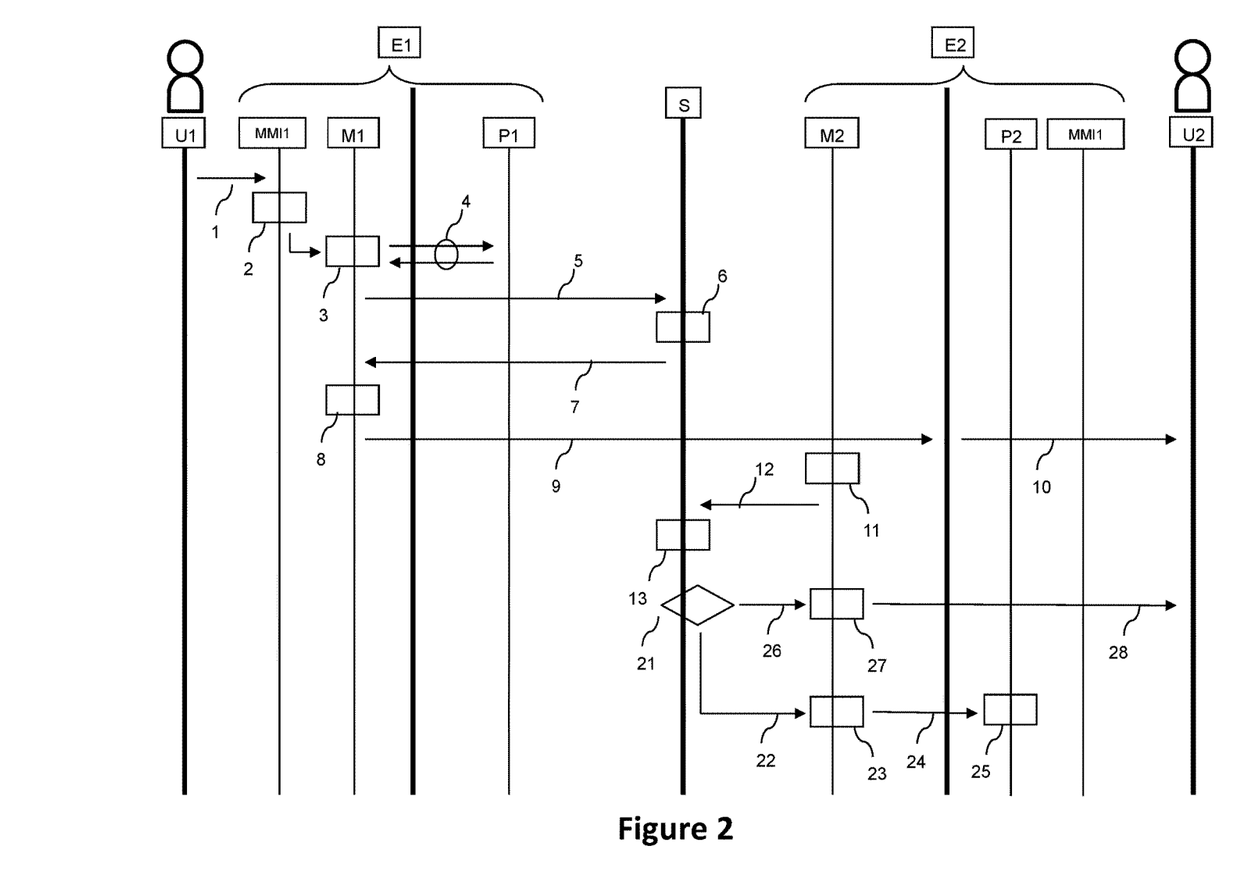
FIG. 2 presents a sequence diagram illustrating a method for rendering a shared content according to a second particular embodiment of the disclosure.

Referring now to FIG. 2, we present a method for sharing content according to a second particular embodiment.

The steps 1 to 13 are identical to those of the first embodiment illustrated in FIG. 1 and described here above. These steps 1 to 13 are therefore not described again.

The steps 14 to 18 of FIG. 1 are replaced by steps 21 to 28 described here below.

At the step 21, the server compares the effective temporal position ("Current_Playback_Position_U1") with C_Duration.

If Current_Playback_Position_U1 is greater than or equal to C_Duration, the server (in the step referenced 26) transmits a message to the module M2 of the second terminal E2 in response to the "Get_Playback_Position" request. This transmitted message states that the first terminal has stopped playing back content and/or that shared playback is impossible. Then, the module M2 (in a step referenced 27) receives this message and (in a step referenced 28) gives it to the second user U2 via the man-machine interface MMI2.

If Current_Playback_Position_U1 is smaller than C_Duration, the server (in a step referenced 22) sends a response to the module M2 of the second terminal E2 replying to the "Get_Playback_Position" request. This response contains the effective temporal position ("Current_Playback_Position_U1") as well as the address "C_URL" and the duration "C_Duration" of the content C. Then the module M2 (in a step referenced 23) receives this response and (in a step referenced 24) activates the player P2 of the second terminal E2 in providing it with the address "C_URL" of the content and the starting playback position "Current_Playback_Position_U1". The player P2 of the second terminal E2 can then (in a step referenced 25) play the content C at the position in which the first terminal E1 is supposed to be at that time (with a slight lag related to the time taken for, exchanges on the network connecting the two terminals E1, E2).

During these playback operations, each of the terminals (the inviting terminal as well as those that have been invited) can move about in the content (forward/rewind/pause) as desired without impacting on the playback of the content by the other terminals. For example, when the playback of the content by the second terminal is in progress, the player of the first terminal can command a pause in the playback of the content which will then display a frozen image of the content at the time of the pause. This pause command will not affect the playback of the content by the player of the second terminal which will continue to play the content. As a consequence, when the first terminal commands the continued playback of the content, the player of the first terminal will then play the content with a delay relative to player of the second terminal playing the same content.

Figure 3:
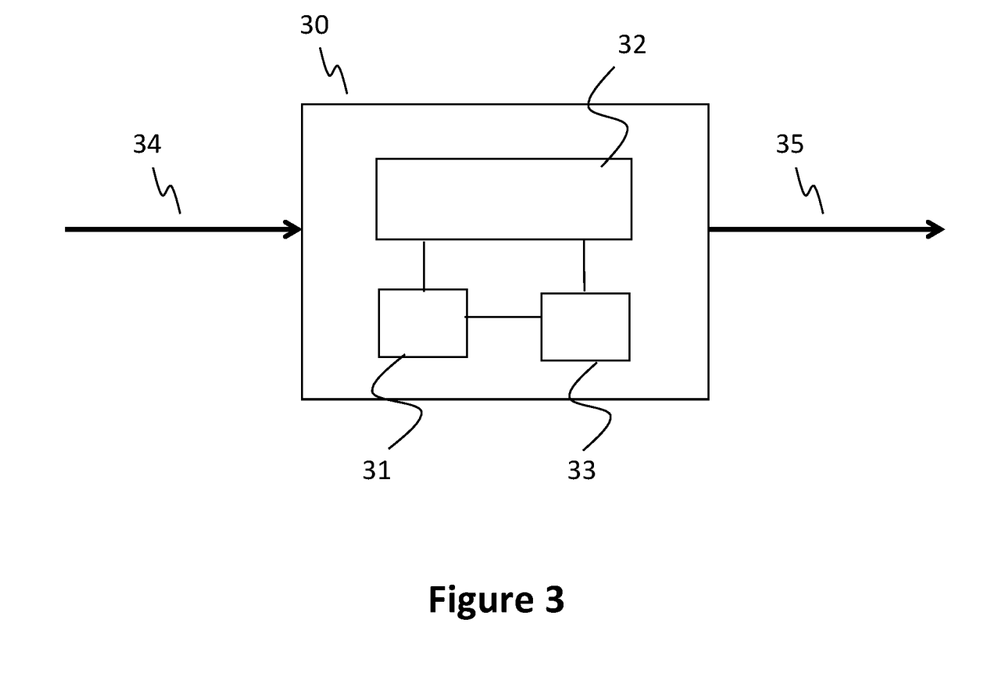
FIG. 3 presents the structure of each of the following three devices: server, first terminal and second terminal according to one particular embodiment of the disclosure.

FIG. 3 presents the simplified structure of each of the three following devices: server, first terminal and second terminal, according to one particular embodiment. These devices enable the implementing of the sharing method according to the disclosure (for example according to one of the embodiments described here above with reference to FIGS. 1 and 2). The device (generically referenced 30) comprises a random-access memory 33 (for example a RAM), a processing unit 31, equipped for example with a processor and driven by a computer program stored in a read-only memory 32 (for example a ROM or a hard-disk drive). At initialization, the computer program code instructions are for example loaded into the random-access memory 33 and then executed by the processor of the processing unit 31. The processing unit 31 receives input signals 34. The processor of the processing unit 31 processes them and generates output signals 35 according to the instructions of the program 32.

FIG. 3 illustrates only one particular way, among several possible ways, of carrying out the different algorithms described in detail here above with reference to FIGS. 1 and 2. Indeed, the technique of the disclosure is carried out equally well (in each of the three devices: server, first terminal and second terminal) on a reprogrammable computing machine (computer, DSP processor, microcontroller) executing a program comprising a sequence of instructions or on a dedicated computing machine (for example a set of logic gates such as an FPGA or un ASIC, or any other hardware module).

In the case of implementation on a reprogrammable computing machine, the corresponding program (i.e. the sequence of instructions) could be stored in a storage medium which may be detachable (for example a floppy disk, a CD-ROM or a DVD-ROM) or not detachable, this storage medium being partially or totally readable by a computer or a processor.

Although the present disclosure has been described with reference to one or more examples, workers skilled in the art will recognize that changes may be made in form and detail without departing from the scope of the disclosure and/or the appended claims.

The invention claimed is:

1. A method comprising:
   rendering, by a second terminal, a content shared by a first terminal with the second terminal, the first terminal being engaged in playing back the content, wherein rendering comprises:
   receiving an invitation by the first terminal to share in the playback of the content;
   transmitting a first request to a server, the first request being a request for obtaining an effective temporal position (ETP) within the content for starting playback;
   a playback, by the second terminal, of the content from the effective temporal position within the content, the effective temporal position ETP being determined as a temporal position of the content played back by the first terminal at an instant T1 when the server receives the first request according to the formula ETP=(T1−T2)+CTP, where T2 is an instant when the server receives a second request from the first terminal indicating a wish to share the content, and where CTP is a temporal position of playback of the content by the first terminal when the first terminal sends the second request;
   prior to the playback, a comparison by the second terminal of the effective temporal position (ETP) with a duration D of the content and wherein the playback is done by the second terminal only if ETP<D; and
   wherein, if ETP≥D, the comparison is followed by furnishing by the second terminal, via a man-machine interface, a message indicating that the first terminal has stopped playing back the content and/or that a shared playback is impossible.

2. A non-transitory computer-readable medium comprising a computer program product stored thereon and comprising program code instructions for implementing a method of rendering, when said program is executed on a computer of a second terminal, wherein the instructions configure the second terminal to perform acts of:
   rendering, by the second terminal, a content shared by a first terminal with the second terminal, the first terminal being engaged in playing back the content, wherein rendering comprises:
   receiving an invitation by the first terminal to share in the playback of the content;
   transmitting a first request to a server, the first request being a request for obtaining an effective temporal position (ETP) within the content for starting playback;
   a playback, by the second terminal, of the content from the effective temporal position within the content, the effective temporal position ETP being determined as a temporal position of the content played back by the first terminal at an instant T1 when the server receives the first request according to the formula ETP=(T1−T2)+CTP, where T2 is an instant when the server receives a second request from the first terminal indicating a wish to share the content, and where CTP is a temporal position of playback of the content by the first terminal when the first terminal sends the second request;
   prior to the playback, a comparison by the second terminal of the effective temporal position (ETP) with a duration D of the content and wherein the playback is done by the second terminal only if ETP<D; and
   wherein, if ETP≥D, the comparison is followed by furnishing by the second terminal, via a man-machine interface, a message indicating that the first terminal has stopped playing back the content and/or that a shared playback is impossible.

3. A non-transitory computer-readable medium comprising a computer program product stored thereon and comprising program code instructions for implementing a method, when said program is executed on a computer of a server, wherein the instructions configure the server to perform acts of:
   determining, by the server, of an effective temporal position within a content shared by a first terminal with a second terminal, the first terminal being engaged in playing back the content, wherein determining comprises:
   receiving by the server of a second request transmitted by the first terminal in order to indicate a wish to share the content, the second request having, as parameters, an address of the content, a duration D of the content and a current temporal position CTP of playback of the content by the first terminal;
   storing by the server, in association with an identifier, the parameters of the second request and a piece of time-stamp information indicating an instant T2 of reception of the second request by the server;
   receiving a first request, which is transmitted by the second terminal to the server following reception of an invitation from the first terminal to share in the playback of the content, the first request being a request for obtaining an effective temporal position (ETP) within the content for starting playback;
   determining by the server said effective temporal position ETP as a temporal position of the content played back by the first terminal at an instant T1 when the server receives the first request from the second terminal according to the following formula: ETP=(T1−T2)+CTP;
   comparing by the server the determined effective temporal position ETP with the duration D of the content;
   transmitting by the server to the second terminal a response to the first request only if ETP<D, the response containing the effective temporal position; and
   if ETP≥D, the comparing is followed by transmitting to the second terminal a message indicating that the first terminal has stopped playing back the content and/or that a shared playback is impossible.

4. A second terminal, comprising:
   a hardware interface, which comprises:
   an input, which is configured to receive an invitation by a first terminal to share in playback of a content, the first terminal being engaged in playing back the content; and
   an output;

a processor; and a non-transitory computer-readable medium comprising instructions stored thereon, which when executed by the processor configure the second terminal to perform acts of:

transmitting through the output a first request to a server, the first request being a request for obtaining an effective temporal position (ETP) within the content for starting playback;

playback, by the second terminal, the content from the effective temporal position within the content, the effective temporal position ETP being determined as a temporal position of the content played back by the first terminal at an instant T1 when the server receives the first request according to the formula ETP=(T1−T2)+CTP, where T2 is an instant when the server receives a second request from the first terminal indicating a wish to share the content, and where CTP is a temporal position of playback of the content by the first terminal when the first terminal sends the second request;

prior to the playback, a comparison by the second terminal of the effective temporal position (ETP) with a duration D of the content and wherein the playback is done by the second terminal only if ETP<D; and wherein, if ETP≥D, the comparison is followed by furnishing by the second terminal, via a man-machine interface, a message indicating that the first terminal has stopped playing back the content and/or that a shared playback is impossible.

5. A server, comprising:

a hardware interface, which is configured to receive:

a second request transmitted by a first terminal in order to indicate a wish to share a content, the second request having, as parameters, an address of the content, a duration D of the content and a current temporal position CTP of playback of the content by the first terminal;

a first request, which is transmitted by a second terminal to the server following reception of an invitation from the first terminal to share in the playback of the content, the first request being a request for obtaining an effective temporal position (ETP) within the content for starting playback, and the first terminal being engaged in playing back the content; and an output;

a processor; and a non-transitory computer-readable medium comprising instructions stored thereon, which when executed by the processor configure the server to perform acts of:

storing, in association with an identifier, the parameters of the second request and a piece of time-stamp information indicating an instant T2 of reception of the second request by the server;

determining the effective temporal position ETP, as a temporal position of the content played back by the first terminal at an instant T1 when the server receives the first request from the second terminal according to the formula: ETP=(T1−T2)+CTP;

comparing by the server the determined effective temporal position ETP with the duration D of the content;

transmitting through the output to the second terminal a response to the first request only if ETP<D, the response containing the effective temporal position; and if ETP≥D, the comparing is followed by transmitting to the second terminal a message indicating that the first terminal has stopped playing back the content and/or that a shared playback is impossible.

6. A method comprising:

determining, by a server, of an effective temporal position within a content shared by a first terminal with a second terminal, the first terminal being engaged in playing back the content, wherein determining comprises:

receiving by the server of a second request transmitted by the first terminal in order to indicate a wish to share the content, the second request having, as parameters, an address of the content, a duration D of the content and a current temporal position CTP of playback of the content by the first terminal;

storing by the server, in association with an identifier, the parameters of the second request and a piece of time-stamp information indicating an instant T2 of reception of the second request by the server;

receiving a first request, which is transmitted by the second terminal to the server following reception of an invitation from the first terminal to share in the playback of the content, the first request being a request for obtaining an effective temporal position (ETP) within the content for starting playback;

determining by the server said effective temporal position as a temporal position of the content played back by the first terminal at an instant T1 when the server receives the first request from the second terminal according to the following formula: ETP=(T1−T2)+CTP;

comparing by the server the determined effective temporal position ETP with the duration D of the content;

transmitting by the server to the second terminal a response to the first request only if ETP<D, the response containing the effective temporal position; and if ETP≥D, the comparing is followed by transmitting to the second terminal a message indicating that the first terminal has stopped playing back the content and/or that a shared playback is impossible.

7. The method according to claim 6, wherein the storing is followed by a transmission from the server to the first terminal of a response to said second request containing said identifier, said invitation and said first request having said identifier as a parameter.

8. The method according to claim 6, wherein the response to the first request also contains an address of the content and a duration of the content.

* * * * *